United States Patent
Pinder et al.

(10) Patent No.: US 8,509,693 B2
(45) Date of Patent: Aug. 13, 2013

(54) METHOD AND SYSTEM FOR AUDIO ROUTING IN A VEHICLE MOUNTED COMMUNICATION SYSTEM

(75) Inventors: Ellis A. Pinder, Davie, FL (US); Jack Wong, Chicago, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 480 days.

(21) Appl. No.: 12/784,924

(22) Filed: May 21, 2010

(65) Prior Publication Data

US 2011/0287719 A1    Nov. 24, 2011

(51) Int. Cl.
*H04B 7/00* (2006.01)

(52) U.S. Cl.
USPC ....... 455/41.3; 455/41.1; 455/41.2; 455/11.1; 455/90.2; 455/518; 455/418; 455/456.1; 455/74; 455/575.2; 455/574

(58) Field of Classification Search
USPC ............... 455/41.3, 41.2, 260, 456.1, 42, 73, 455/575.2, 574, 553.1, 68, 88, 413, 11.1, 455/90.2, 41.1, 518, 418, 74, 55, 3.1
See application file for complete search history.

(56) References Cited

U.S. PATENT DOCUMENTS

| | | | | |
|---|---|---|---|---|
| 5,978,689 | A * | 11/1999 | Tuoriniemi et al. | 455/569.1 |
| 6,230,029 | B1 * | 5/2001 | Hahn et al. | 455/575.2 |
| 6,311,052 | B1 * | 10/2001 | Lenz | 455/305 |
| 7,142,814 | B2 | 11/2006 | Nassimi | |
| 7,146,187 | B2 * | 12/2006 | Richards et al. | 455/556.1 |
| 7,174,168 | B2 * | 2/2007 | Klein et al. | 455/445 |
| 7,444,174 | B2 * | 10/2008 | Zhu et al. | 455/575.1 |
| 7,818,036 | B2 * | 10/2010 | Lair et al. | 455/575.2 |
| 7,818,037 | B2 * | 10/2010 | Lair et al. | 455/575.2 |
| 7,941,193 | B2 * | 5/2011 | Zhu et al. | 455/575.5 |
| 8,010,171 | B2 * | 8/2011 | Fettig et al. | 455/575.2 |
| 8,082,010 | B2 * | 12/2011 | Crestol | 455/569.1 |
| 8,126,492 | B2 * | 2/2012 | Hannosh et al. | 455/518 |
| 8,195,253 | B2 * | 6/2012 | Roberts et al. | 455/575.2 |
| 2004/0203351 | A1 * | 10/2004 | Shearer et al. | 455/41.1 |
| 2005/0221852 | A1 * | 10/2005 | D'Avello et al. | 455/518 |
| 2005/0273609 | A1 | 12/2005 | Eronen | |
| 2006/0194604 | A1 * | 8/2006 | Dieringer | 455/550.1 |
| 2007/0254709 | A1 * | 11/2007 | Higgins | 455/557 |
| 2008/0014865 | A1 * | 1/2008 | Roberts et al. | 455/11.1 |
| 2008/0032624 | A1 * | 2/2008 | Abraham | 455/11.1 |

(Continued)

OTHER PUBLICATIONS

PCT International Search Report Dated Nov. 30, 2011 for Counterpart Application.

*Primary Examiner* — Temesgh Ghebretinsae
*Assistant Examiner* — MD Talukder
(74) *Attorney, Agent, or Firm* — Barbara R. Doutre; Daniel R. Bestor

(57) ABSTRACT

A system and method for routing audio for a vehicle mounted communication system includes activating (210) a (Push-To-Talk) PTT button associated with a handheld or rear microphone and determining (220) whether a short range wireless device is operationally coupled with the vehicle mounted communication device. In accordance with an embodiment, first audio signals received (260) from a microphone of the short range wireless device are transmitted to a remote party (265) when the short range wireless device is operationally coupled to the vehicle mounted communication device. Second audio signals received (270) from a remote party are routed (275) to a speaker of the short range wireless device, when the short range wireless device is operationally coupled with the vehicle mounted communication device and the PTT button is activated.

12 Claims, 3 Drawing Sheets

(56) References Cited

U.S. PATENT DOCUMENTS

| | | | |
|---|---|---|---|
| 2008/0085679 A1* | 4/2008 | Fettig et al. | 455/41.2 |
| 2008/0085689 A1* | 4/2008 | Zellner | 455/187.1 |
| 2008/0125042 A1* | 5/2008 | Kim | 455/41.2 |
| 2009/0174572 A1 | 7/2009 | Smith | |
| 2010/0041337 A1 | 2/2010 | Lofton | |
| 2011/0177778 A1* | 7/2011 | Roberts et al. | 455/11.1 |
| 2011/0275401 A1* | 11/2011 | Fettig et al. | 455/518 |
| 2011/0287719 A1* | 11/2011 | Pinder et al. | 455/41.3 |
| 2012/0135685 A1* | 5/2012 | Higgins | 455/41.2 |
| 2012/0238237 A1* | 9/2012 | Crestol | 455/404.2 |

* cited by examiner

METHOD AND SYSTEM FOR AUDIO ROUTING IN A VEHICLE MOUNTED COMMUNICATION SYSTEM

FIELD OF THE DISCLOSURE

The present disclosure relates generally to communication systems, and more particularly, to various configurations of Vehicle-Mounted Communication Systems for audio routing.

BACKGROUND

A Vehicle-Mounted Communication System includes a two-way mobile (vehicular) radio installed in a vehicle in either a dash mount or remote mount configuration. A dash-mounted radio system typically comprises a console or control head and a transceiver mounted under the dashboard of a vehicle, whereas a remote-mounted radio system may have various radio components situated in other parts of the vehicle, such as the transceiver in the trunk. The Vehicle-Mounted Communication System often includes a front microphone, also called a "potato mic" or a handheld microphone, attached to the control head and may optionally have a rear microphone attached to an accessory port, such as a rear accessory connector. The front microphone typically utilizes a push-to-talk (PTT) switch, while the rear microphone is typically provided with PTT capability via a footswitch.

Audio routing in the vehicular radio traditionally follows a set of rules, referred to as "microphone follows PTT" rules. According to these rules, when the PTT button associated with a given microphone is pressed, then the vehicular radio transmits the audio received at the associated microphone. For example, when the PTT button associated with the rear microphone is pressed, then transmission audio is taken from the rear microphone. The audio paths are distinct and individually controllable and the PTTs are individually detectable. Historically, Vehicle-Mounted Communication Systems, for example systems developed by Motorola, Inc. have followed the convention of "microphone follows PTT" for radio operation.

The vehicular radio also includes an audio power amplifier (PA) which drives a main speaker and, subsequently, conveys received audio to a user. In a Vehicle-Mounted Communication System, the main speaker can be integrated into the control head, or it can be a remote, external speaker connected to an accessory port.

Additionally, the vehicular radio may be optionally configured for a public address mode of operation. If the radio is so configured, an auxiliary speaker, typically containing an integral audio power amplifier, is installed and attached to a designated port on the radio's rear accessory connector. This auxiliary speaker is not the same as the external speaker previously mentioned. While both speakers are "external" to the radio, the external speaker is typically an un-powered speaker used as a main radio speaker and driven by the radio's built-in audio PA. In contrast, the auxiliary speaker is typically a powered speaker that operates independently from the external speaker. Alternatively, the vehicular radio can be designed such that either of the speakers, external and auxiliary, can be powered or un-powered.

Additionally, a "Public Address Switch" can be mounted on the vehicular radio or mounted external to the vehicular radio and wired to the accessory connector. The Public Address switch is used to enable or disable a public address mode of operation. If the Public Address switch is off, then the radio operation is "normal" meaning that the audio received by the vehicular radio goes to the main speaker powered by the radio's internal audio power amplifier and the audio that is to be transmitted by the vehicular radio, using radio frequency (RF) transmission, goes from a front or rear microphone to the transmitter (with the PTT button determining the particular microphone audio source). If the Public Address switch is on, then RF transmission of the audio by the handheld microphone is disabled. In this case, pressing the PTT button associated with the handheld microphone routes audio from the handheld microphone to the auxiliary speaker. Note that it is possible (by design) for a user to use public address while the radio is receiving audio and conveying the received audio over the main speaker. The public address feature is commonly used on buses and other public transportation.

Optimizing the routing of audio in a vehicular environment in accordance with the variety of different operating modes can be challenging. The user may be operating the radio system within a variety of different scenarios. For example, police officers may utilize the vehicular radio while driving or while standing outside of the vehicle and need to switch from using one microphone or speaker to another. Implementing accessories to operate as part of the communication system within the vehicular environment presents many design challenges, including size, cost and ease of operation. While certain accessories may provide desired functionality in a cellular environment, many such devices are not readily applicable to the two-way radio environment, largely due to the PTT nature of the two-way system. A common off the shelf (COTS) Bluetooth headset, for example, traditionally used with a cell phone is not very useful with vehicular radios as two-way radios generally require a PTT button. The use of headsets in general can be problematic in a vehicular environment. For example, if the headset falls off while the user is driving, communication is disrupted.

Accordingly, it would be desirable to have an improved communication system, particularly for the vehicular environment.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof may be best understood with reference to the following description, taken in conjunction with the accompanying drawings. The drawings show a form of the invention that is presently preferred; however, the invention is not limited to the precise arrangement shown in the drawings.

Figure 1:
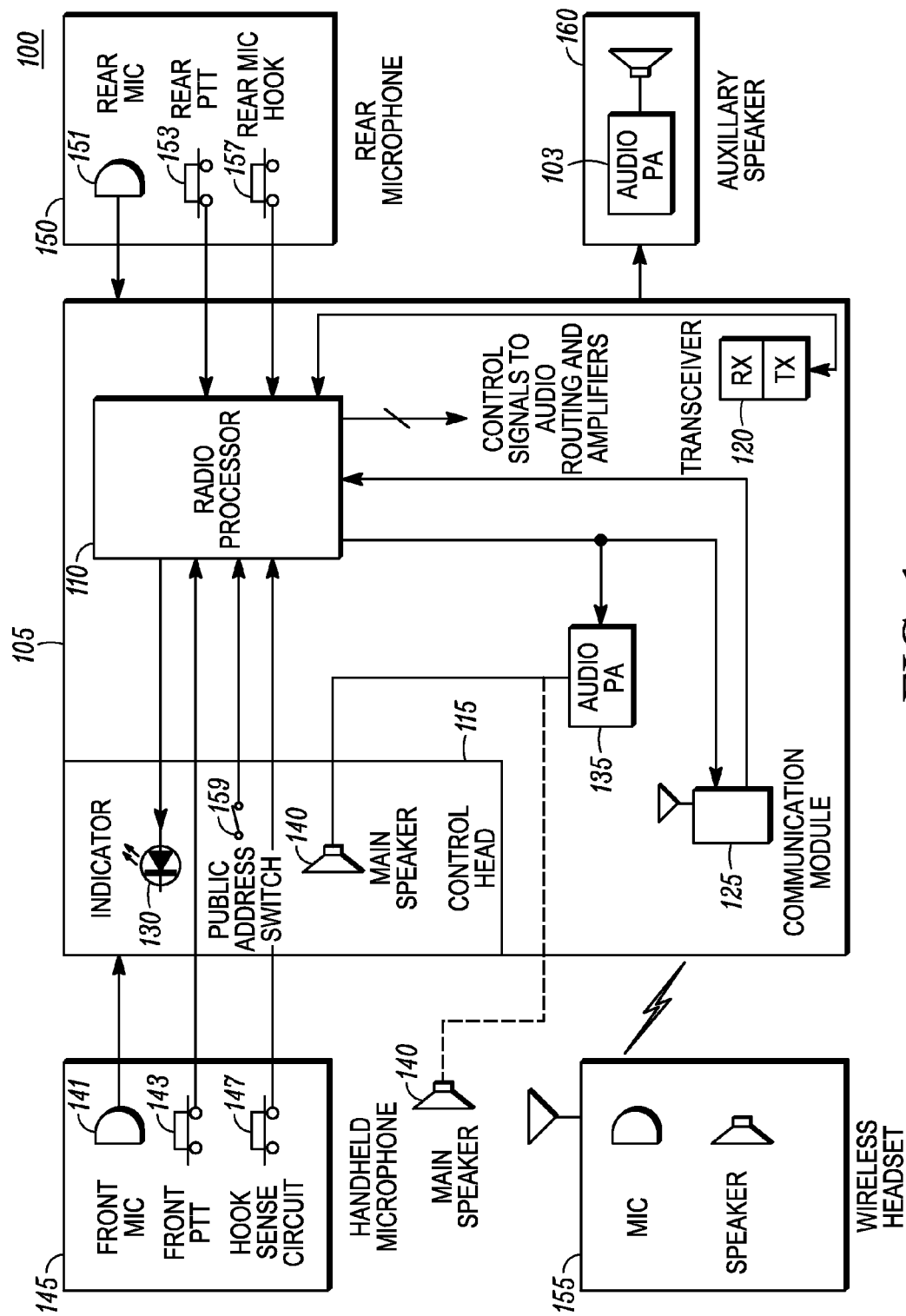
FIG. 1 is a block diagram of a Vehicle-Mounted Communication System in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and system components related to audio routing in a vehicle mounted communication system. For the purposes of this application a vehicle mounted communication system refers to a two-way mobile radio and the accessories operating in conjunction therewith. The system to be described herein addresses the challenges of managing and optimizing accessory usage within the vehicular environment providing optional audio routing paths depending on the location of a user or users in or about the vehicle and whether a privacy environment is desired or a public announcement environment is desired for a call or calls. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

Briefly, there is provided herein an enhanced Vehicle-Mounted Communication System that is capable of using a COTS Bluetooth headset or similar PAN device and routing audio accordingly. Users of two-way Vehicular radios may particularly benefit from using Bluetooth within the communication system as it facilitates the implementation of a plurality of different communication modes providing different selectable audio routing paths. Selectable audio routing provides an unobtrusive manner to carry on one or more different conversations by one or more users of the system (for example a bus driver and a tour guide).

The present invention utilizes existing Bluetooth headsets and other short range wireless headsets that do not contain an integral PPT button for use with a two-way Vehicle-Mounted Communication System. The Vehicle-Mounted Communication System includes a Bluetooth accessory or a similar PAN module intended for short range audio and/or data communications. Routing techniques utilized in conjunction with the Bluetooth headset provide the ability to route received audio from the radio receiver to the Bluetooth accessory and the ability to route transmit audio from the Bluetooth accessory to the vehicular radio main transmitter. While the accessories and routing techniques provided herein may contain or utilize an integral PTT, the accessories and routing techniques are particularly useful with audio accessories that do not contain an integral PTT button.

In the present invention, depending upon a pairing status of a Bluetooth audio accessory and an operating mode of the mobile radio, the audio routing and the type of events triggered by various PTT sources will be altered.

Referring to FIG. 1, there is shown a Vehicle-Mounted Communication System 100 operating in accordance with an embodiment of the invention. Vehicle-Mounted Communication System 100 comprises a vehicular (mobile) radio 105, a handheld microphone 145, a rear microphone 150, a short range wireless headset 155, and an auxiliary speaker 160. The mobile radio 105 is installed in a vehicle in either a dash mount or remote mount configuration. The dash mount or remote mount mechanisms and layout are separate from the mobile radio 105 and are not shown in FIG. 1. The mobile radio 105 further includes a radio processor 110, a control head 115, a main radio transceiver 120, a short range communication module 125, an indicator 130, an audio power amplifier (PA) 135, a main speaker 140, and a Public Address Switch 159. The Public Address switch can also be mounted external to the radio 105. The mobile radio 105 operates in a public address mode when the Public Address Switch 159 is activated.

The radio processor 110 controls the various elements of the Vehicle-Mounted Communication System 100. The radio processor 110 may include audio routing circuitry and is responsible for performing all the processing, such as, routing received audio, routing transmitted audio, receiving indications, receiving and transmitting control signals, etc. associated with the Vehicle-Mounted Communication System 100. In an alternate example, the radio processor 110 may not include audio routing circuitry, and the audio, in this example, is not routed through the radio processor.

In one example, the microphone 145 may be a handheld microphone, such as a potato mic used in police vehicles with an integrated PTT button. In yet another example, the microphone 145 may be a handset with an optional keypad and an integrated PTT button. The handset microphone may also include a low-power speaker to allow discreet listening. For the sake of simplicity, various embodiments mentioned below are explained using the handheld microphone configuration of the microphone 145. However, other configurations of the microphone 145 can be substituted in the embodiments explained below by a person of ordinary skill in the art.

The handheld microphone 145 is connected to the mobile radio 105 via the control head 115. The handheld microphone 145 includes a microphone element shown as a front microphone 141, with an integrated PTT button 143 coupled thereto, and a hook sense circuit 147. The handheld microphone 145 typically rests on a hook (not shown). The hook can be a holder, a clip, a cradle, a hang up box, or any other type of mounting means that retain the handheld microphone in a desired mounting location but also allows for easy removal and replacement. The handheld microphone 145 has the ability to detect whether or not it is coupled to the hook or off the hook and accordingly operates in an "on-hook" and "off-hook" mode of operation. This detection is done by the hook sense circuit 147 using electrical and/or mechanical means, and the state is conveyed to the processor 110 of the mobile radio 105 by sending a signal to the control head 115.

Similarly, the rear microphone 150 is communicatively coupled to the radio processor 110 of the mobile radio 105. The rear microphone 150 includes a microphone element shown as a rear mic 151, an integrated rear PTT button 153, and a rear microphone hook 157 (optional). In one example, the rear microphone 150 may be a handheld microphone, such as a potato mic used in police vehicles with an integrated PTT button. In another example, the rear microphone 150 may be a telephone style handset with an integral PTT button. In yet another example, the rear microphone 155 may be a headset worn in a helmet with a handlebar-mounted PTT button, such as used by motorcycle police. In another example, the rear microphone 155 may be a visor microphone which is a microphone placed on or near the visor of a vehicle. The visor microphone does not have an integrated PTT button and the PTT button in this case can be mounted somewhere in the vehicle, such as a footswitch. The various embodiments explained below can work for any configuration of the rear microphone 155.

In accordance with an embodiment, the short range wireless headset 155, such as a Bluetooth headset, can be operatively coupled to the short range communication module 125 of the mobile radio 105. The short range wireless headset 155 can be operatively coupled to the short range communication module 125 by using Bluetooth technology, infrared technology, personal area network, or any other short range wireless technology.

The mobile radio 105 further includes an audio power amplifier (PA) 135 which drives the main speaker 140, also called a front speaker, and conveys received audio to the main speaker 140. In one example, the main speaker 140 is integrated into the control head 115. In another example, the main speaker 140 is external to the control head 115 and is connected to an accessory port.

In accordance with the present invention, when the short range wireless headset 155 is not operatively coupled, in other words paired, to the short range communication module 125 then standard two-way radio operations with regards to PTT and audio routing is performed.

When the short range wireless headset (such as a Bluetooth headset) 155 is operatively coupled to the short range communication module 125 then the radio operation with regards to PTT and audio routing is altered. In accordance with the present invention, it is assumed that if the Bluetooth headset 155 is actively paired with the communication module 125 of the mobile radio 105, then a user of the Vehicle-Mounted Communication System 100 desires to use the Bluetooth headset 155 as a primary audio path and the audio is routed accordingly.

In a first embodiment a variety of handheld microphone 145 and front PTT button 143 configurations are described. If the PTT button 143 associated with the handheld microphone 145 is activated then the radio processor 110 determines whether the short range wireless headset 155 is operatively coupled with the short range communication module 125 and whether the handheld microphone 145, also called a first microphone, is in an on-hook mode of operation or an off-hook mode of operation. In this case, the processor 110 determines that the handheld microphone 145 is in an on-hook mode of operation and the short range wireless headset 155 is operatively coupled with the short range communication module 125. Consequently, the processor 110 routes the audio originating from the wireless headset 155 to the transceiver 120 associated in the radio 105. The transceiver 120 is a high-power transceiver and further transmits this audio using long range RF transmission to a remote party from the mobile radio 105. In other words, the radio 105 transmits the audio that a user of the Vehicle-Mounted Communication System 100 speaks into a microphone associated with the wireless headset 155 to a remote party.

Additionally, when the short range wireless headset 155 is paired with the short range communication module 125 and the handheld microphone is on-hook, then the processor 110 also routes received audio signals to a speaker associated with the wireless headset 155, which in turn plays the audio on the speaker of the wireless headset 155. The received audio signals are the signals that are received by the transceiver 120 of the mobile radio from a remote party such as another Vehicle-Mounted Communication System, another mobile device, and the like.

In this embodiment, while the wireless headset 155 is paired, and the processor 110 detects a disconnect request for disconnecting the wireless headset 155 from the communication module 125, then the audio signals received by the mobile radio 105 are routed to the front speaker 140. Also, if at anytime while the wireless headset 155 is paired, the processor 110 detects that a link coupling the short range wireless headset 155 with the short range communication module 125 is lost, then the processor 110 starts a link re-try timer. If the link is re-established before the timer expires, then the operation resumes and the received audio signals are conveyed to the wireless headset 155. Otherwise, if the link is not re-established before the timer expires, then the received audio signals are conveyed to the main speaker 140 and the audio from the microphone associated with the wireless headset 155 cannot be routed anywhere.

In the meantime, while the short range wireless headset 155 is paired with the short range communication module 125 and the handheld microphone is on-hook, the processor 110 detects activation of the Public Address switch 159 and a Public Address mode is activated. Upon activation of the Public Address mode, the audio from the short range wireless headset 155 is routed to the auxiliary speaker 160. The auxiliary speaker 160 is typically located in the back of the vehicle, typically where passengers are seated. As a result, a user of the Vehicle-Mounted Communication System 100 is able to make announcements to the passengers by using the wireless headset 155.

However, upon activation of the PTT button 143 associated with the handheld microphone 145, if the processor 110 determines that the handheld microphone 145 is in an off-hook mode of operation and the short range wireless headset 155 is operatively coupled with the short range communication module 125, then the processor 110 causes the mobile radio 105 and transceiver 120 to transmit the audio from the handheld microphone 145. In other words, the radio 105 transmits the audio that a user of the Vehicle-Mounted Communication System 100 speaks into the front microphone 141 associated with the handheld microphone 145 to a remote party, such as another Vehicle-Mounted Communication System, another mobile device, and the like.

Additionally, when the short range wireless headset 155 is paired with the short range communication module 125 and the handheld microphone 145 is off-hook, then the processor 110 routes the received audio to the front speaker 140. In another example, when the short range wireless headset 155 is paired with the short range communication module 125 and the handheld microphone is off-hook, then the processor 110 may simultaneously route the received audio to the front speaker 140 as well as to a speaker comprised in the wireless headset 155.

In the meantime, while the short range wireless headset 155 is paired with the short range communication module 125 and the handheld microphone is off-hook, and the processor 110 detects activation of the public address switch 159 then the Public Address mode is activated. In this case, upon activation of the Public Address mode, the audio from the front microphone 141 of the handheld microphone 145 is routed to the auxiliary speaker 160. As a result, a user of the Vehicle-Mounted Communication System 100 is able to make announcements to the passengers by using the handheld microphone 145 even when the wireless headset 155 is paired with the mobile radio 105.

In a second embodiment of the present invention a variety of rear microphone 150 and rear PTT button 153 configurations are described. If the wireless headset 155 is operatively coupled with the mobile radio 105 and the rear PTT button 153 associated with the rear microphone 150 is activated and, then the radio processor 110 coupled with the rear microphone 150 instructs the transceiver 120 to receive audio signals from the short range wireless device (such as, a headset) 155. In other words, the processor 110 causes the transceiver 120 of the mobile radio 105 to receive the audio from the wireless device 155 and further transmit this audio to another device, another Vehicle-Mounted Communication System, another mobile device, and the like. These are the audio signals that a user of the Vehicle-Mounted Communication System 100 speaks into a microphone associated with the wireless headset 155.

Additionally, in this second embodiment the processor 110 also routes received audio signals to a speaker comprised in the short range wireless device 155, which in turn is played on the speaker. Optionally, the processor 110 may also route the received audio signals to the main speaker 140. The received audio signals are the signals that are received by the transceiver 120 of the mobile radio from a remote party such as another Vehicle-Mounted Communication System, another mobile device, and the like.

In the meantime, while the short range wireless headset 155 is paired with the short range communication module 125, if the processor 110 detects activation of the public address switch 159 then a Public Address mode is activated. Upon activation of the Public Address mode, the audio from microphone of the short range wireless device 155 is routed to the auxiliary speaker 160. However, if the handheld microphone 145 is detected to be off-hook, then the processor 110 routes the audio from the microphone element 141 of the handheld microphone 145 to the auxiliary speaker 160.

In the second embodiment, if the rear PTT button 153 associated with the rear microphone 150 is activated and the wireless headset 155 is not paired with the short range communication module 125, then the radio processor 110 instructs the transceiver 120 to receive audio signals from rear microphone 151. In other words, the processor 110 causes the mobile radio 105 transceiver 120 to receive the audio from the rear microphone 151 and further transmit this audio to another device. Additionally, the processor 110 also routes received audio signals to the main speaker 140, which in turn is played on the main speaker 140.

In the meantime, while the wireless headset 155 is not paired with the short range communication module 125, if the processor 110 detects activation of the public address switch 159 then the processor 110 routes the audio, from the rear microphone 151, to the auxiliary speaker 160.

During all these different configurations, the indicator 130, such as a Bluetooth link status indicator, on the control head 115 indicates a status of connection between the short range wireless headset 155 and the short range communication module 125. This indicator 130 may be an icon, voice prompt, or other type of indicator, and it may alternately be located on any other accessory or element associated with the mobile radio 105. The indicator 130 helps to quickly convey the status of the link to the user, as well as the corresponding audio routing. In one example, a solid blue LED at the indicator 130 indicates an active link (operatively coupled) with audio routing to wireless headset 155. A slow blinking blue LED at the indicator 130 indicates active link with audio routed to front speaker 140 and from front microphone 141. A fast blinking blue LED at the indicator 130 indicates a link failure and active re-try timer. An inactive LED at the indicator 130 indicates no wireless headset 155 coupled to the radio 105. Various other configurations of the indicator 130 are within of the scope of the present invention.

In one embodiment, regardless of the state of the handheld microphone's 145 hook status, the rear PTT button 153 shall be used as a wireless headset PTT if a wireless headset 155 is coupled thereto. In this embodiment, rear PTT 153 controls the microphone of the wireless headset 155. In an alternate embodiment, a codeplug option may be used to force the rear PTT button 153 to always route audio from the rear microphone 151 to the main transceiver 120 when the rear PTT button 153 is pressed, regardless of the wireless headset being paired or not.

The audio routing configurations explained above are very convenient while driving as the driver can press a PTT button 143 in the handheld microphone 145 or the driver can press a rear PTT button 153 associated with the rear microphone 150 (for example, a footswitch) and have a private conversation with a remote party without disturbing other vehicle occupants. Moreover, the present invention communication can still be used when the driver is located outside the vehicle, for example waiting for a customer or loading luggage into a trunk. Additionally, if the wireless headset 155 falls on the floor while the driver is driving and the wireless headset 155 is still operationally coupled, the above system allows the driver to merely pick up the handheld microphone 145 from the hook for off-hook communication. Also, the system 100 for audio routing allows a passenger in the vehicle to listen in or join a conversation while a wireless headset is paired and in use. Because the system 100 uses a wireless headset, such as a common-off-the-shelf Bluetooth headset without an integrated PTT button, the solution provided is cost effective as costly Bluetooth headsets with an integrated PTT button are not needed. However, the above described invention can be very well used with a wireless headset that comes with an integrated PTT button.

Figure 2:
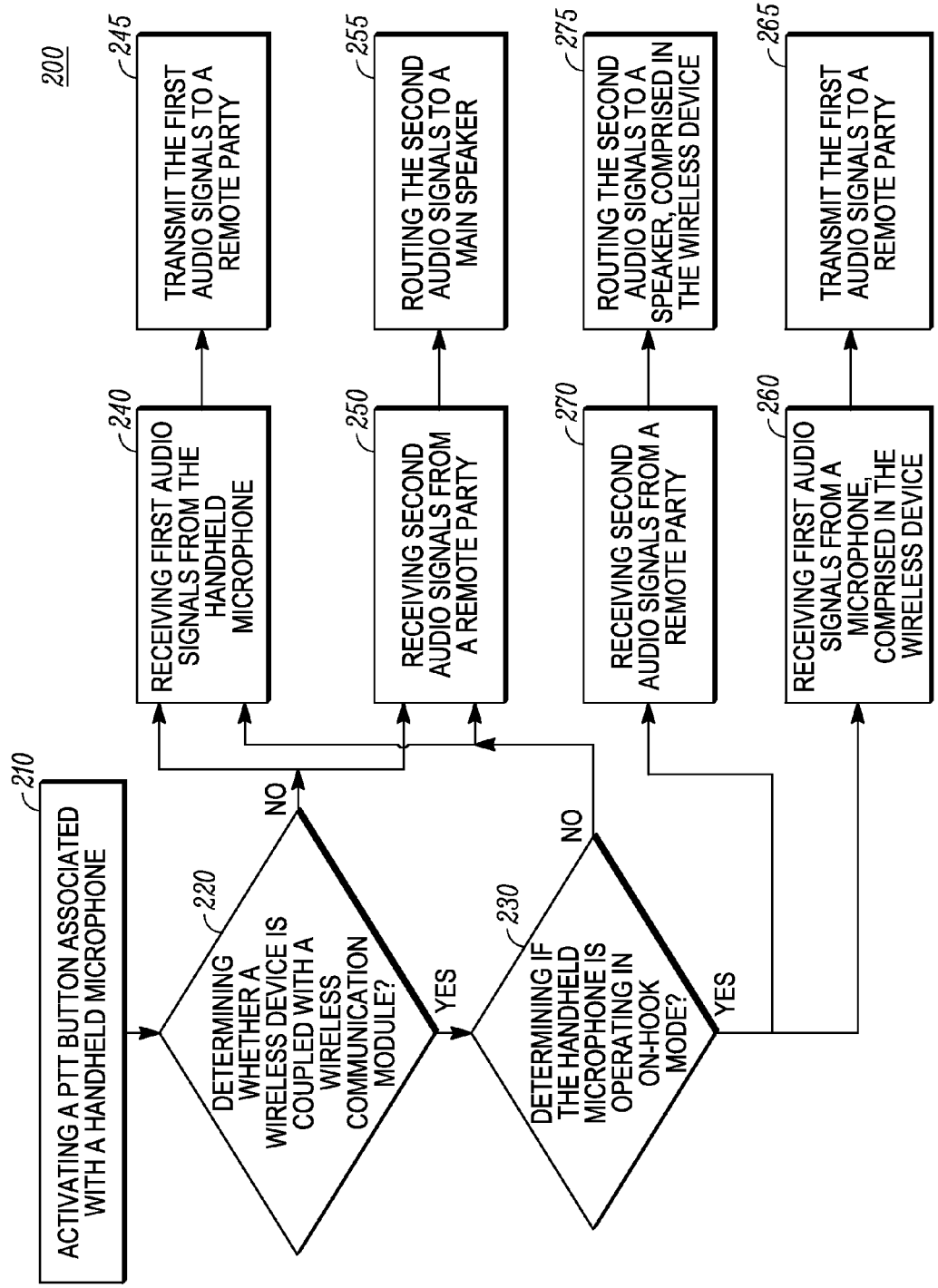
FIG. 2 is a flowchart providing a method of routing audio for a Vehicle-Mounted Communication System in accordance with an embodiment of the invention.

FIG. 2 is a flowchart providing a method of routing audio for a Vehicle-Mounted Communication System (such as, system 100 of FIG. 1) in accordance with an embodiment of the invention. The method 200 of FIG. 2 starts upon activation 210 of a PTT button associated with a microphone (such as, the handheld microphone 145 of FIG. 1). The PTT button can be activated by a user of the Vehicle-Mounted Communication System.

Upon activation of the PTT button, the Vehicle-Mounted Communication System determines 220 whether a short range wireless device (such as, a Bluetooth headset 155 of FIG. 1) is operationally coupled with a wireless communication module (such as, a wireless communication module 125 of FIG. 1), comprised in the Vehicle-Mounted Communication System. If the wireless device is operatively coupled to a communication module, then the Vehicle-Mounted Communication System determines 230 if the handheld microphone associated with the Vehicle-Mounted Communication System is operating in an on-hook mode or an off-hook mode of operation.

When the system determines that the handheld microphone is operating in an off-hook mode or the wireless device is not operatively coupled with the wireless communication module, then the Vehicle-Mounted Communication System receives 240 first audio signals from the handheld microphone and transmits 245 them to a remote party. In other words, the device transmits the audio signals that a user of the device speaks into the handheld microphone to another device, such as another Vehicle-Mounted Communication System, another mobile device, and the like. In the meantime, the device may also receive 250 second audio signals. The second audio signals are the signals that are received by a transceiver of the system from a remote party such as another Vehicle-Mounted Communication System, another mobile device, and the like. The system routes 255 the second audio signals to a main speaker associated with the Vehicle-Mounted Communication System if the handheld microphone is operating in an off-hook mode or the wireless device is not operatively coupled with the mobile radio.

Otherwise, if the system determines that the handheld microphone is operating in an on-hook mode then the system receives 260 first audio signals from a microphone associated with the wireless device and transmits 265 them to a remote party. In other words, the Vehicle-Mounted Communication System transmits the audio that a user speaks into the microphone of the short-range wireless device to another device, such as another Vehicle-Mounted Communication System, another mobile device, and the like. In the meantime, the Vehicle-Mounted Communication System may also receive 275 second audio signals from a remote party. The second audio signals are the signals that are received by a transceiver of the Vehicle-Mounted Communication System from a remote party and are further routed to the speaker of the wireless device. The Vehicle-Mounted Communication System routes 275 the second audio signals to a speaker associated with the wireless device if the handheld microphone is operating in an on-hook mode and the wireless device is operatively coupled with the wireless communication module comprised in the Vehicle-Mounted Communication System.

Using the method of FIG. 2, a driver can press a PTT button in the handheld microphone and have a private conversation with a remote party without disturbing other vehicle occupants. Moreover, by routing the audio to and from the wireless device, communication can be provided if the driver is outside of the vehicle, for example loading equipment into the trunk.

Figure 3:
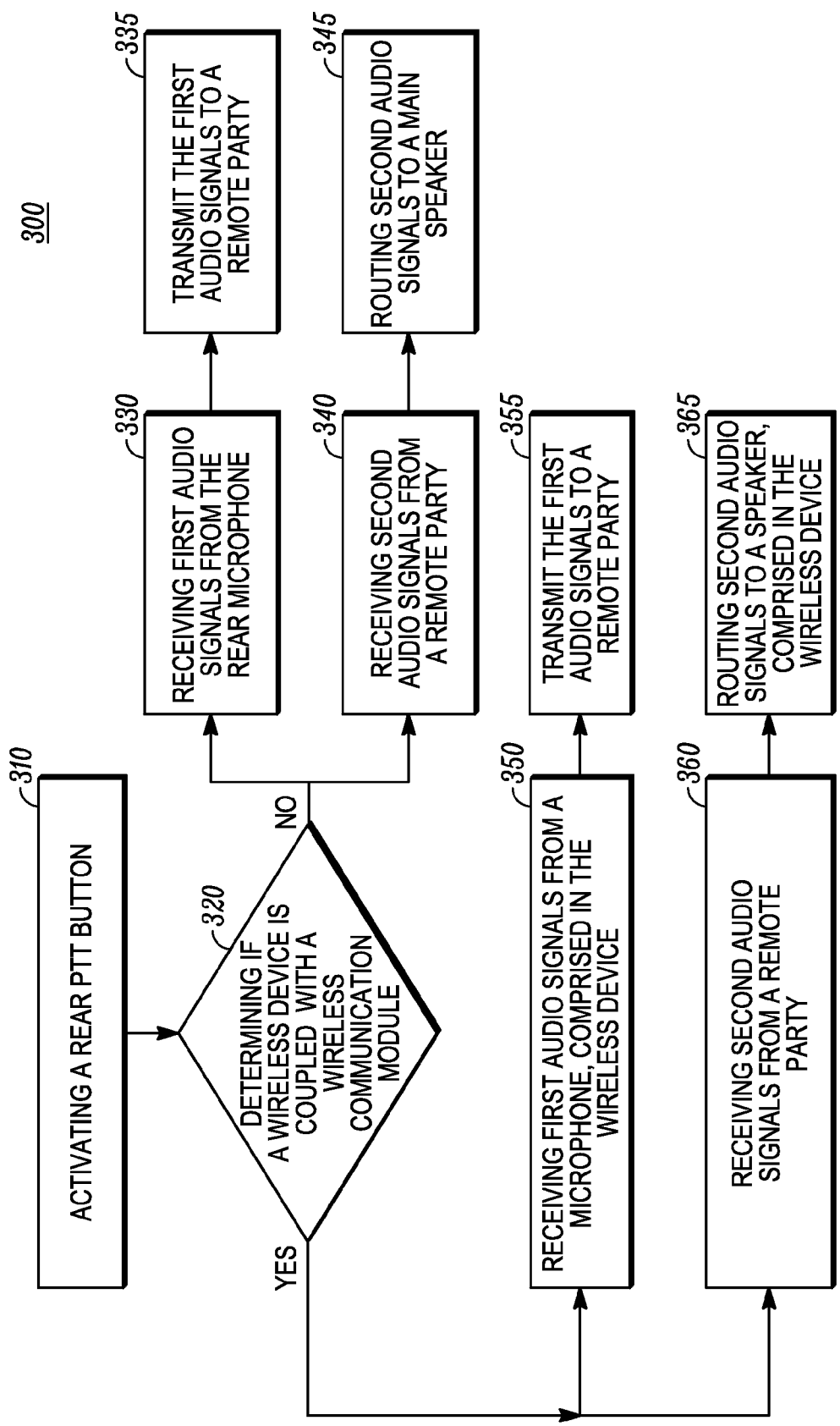
FIG. 3 is a flowchart providing another method of routing audio for a Vehicle-Mounted Communication System in accordance with an embodiment of the invention.

FIG. 3 is a flowchart providing another method of routing audio for a Vehicle-Mounted Communication System in accordance with an embodiment of the invention. The method 300 of FIG. 3 starts upon activation 310 of a rear PTT button (such as, the PTT button 153 associated with the rear microphone 150 of FIG. 1). The rear PTT button can be activated by a user of the Vehicle-Mounted Communication System.

Upon activation of the rear PTT button, the Vehicle-Mounted Communication System determines 320 whether a short range wireless device (such as, a Bluetooth headset 155 of FIG. 1) is operationally coupled with wireless communication module, comprised in the Vehicle-Mounted Communication System or not. In case, if the wireless device is not coupled, then the Vehicle-Mounted Communication System receives 330 first audio signals from the rear microphone and transmits 335 them to a remote party. In other words, the Vehicle-Mounted Communication System receives the audio that a user speaks into the rear microphone and transmits 335 it to another device. However, if the rear microphone does not have any microphone element associated with it and the codeplug-settable option allows the rear PTT button to be used as a wireless headset PTT, then the Vehicle-Mounted Communication System receives the first audio signals from a microphone of the wireless headset and transmits them to a remote party.

In the meantime, the Vehicle-Mounted Communication System may also receive 340 second audio signals. The second audio signals are the signals that are received from a remote party by a transceiver of the Vehicle-Mounted Communication System. The Vehicle-Mounted Communication System routes 345 the second audio signals to a main speaker associated with the system if the wireless device is not operatively coupled with the wireless communication module of the Vehicle-Mounted Communication System.

Otherwise, if it is determined that the wireless device is operatively coupled to the wireless communication module comprised in the Vehicle-Mounted Communication System then the system receives 350 first audio signals from a microphone associated with the wireless device and transmits 355 them to a remote device. In other words, the system transmits 355 the audio that a user of the system speaks into the microphone or plays at the microphone of the short-range wireless device to another device, such as another Vehicle-Mounted Communication System, another mobile device, and the like. In the meantime, the Vehicle-Mounted Communication System may also receive 360 second audio signals from a remote party. The second audio signals are the signals that are received by a transceiver of the System from a remote party such as another Vehicle-Mounted Communication System, another mobile device, and the like and are further routed to the speaker of the wireless device. The Vehicle-Mounted Communication System routes 365 the second audio signals to a speaker comprised in the wireless device if the wireless device is operatively coupled with the wireless communication module of the Vehicle-Mounted Communication System.

Using the method of FIG. 3, a driver can press a rear PTT button, typically a foot switch, associated with the rear microphone and have a private conversation with a remote party without disturbing other vehicle occupants.

The above described system and methods for routing audio using a Bluetooth headset provides an unobtrusive manner of communicating within and about a two-way Vehicular radio system. The communication system operating in accordance with the various embodiments also provides a very cost effective solution as it can be used with a COTS headset that does not include a PTT button. The various embodiments provided by the two-way vehicular radio system provide user benefits in the form of selectable call control options which allow a call to be taken based on the call environment in which the user wishes to operate, such as having a private conversation within the car, a public address announcement from the car, having multiple users of the system (e.g. a bus driver and tour guide) using different operating modes at the same time in conjunction with facilitating changing these modes as a result of the user's location within or about the vehicle. For example, a bus driver can listen to the main speaker while a tour guide uses the auxiliary speaker of the public address mode and the audio routing can be changed as the handheld microphone is placed on-hook and off-hook.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. A device or structure that is "configured" in a certain way is configured in at least that way, but may also be configured in ways that are not listed.

It will be appreciated that some embodiments may be comprised of one or more generic or specialized processors or "processing devices" such as microprocessors, digital signal processors, customized processors and field programmable gate arrays FPGAs and unique stored program instructions including both software and firmware that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits ASICs, in which each function or some combinations of certain of the functions are implemented as custom logic. Of course, a combination of the two approaches could be used.

Moreover, an embodiment can be implemented as a computer-readable storage medium having computer readable code stored thereon for programming a computer e.g., comprising a processor to perform a method as described and claimed herein. Examples of such computer-readable storage mediums include, but are not limited to, a hard disk, a CD-ROM, an optical storage device, a magnetic storage device, a ROM Read Only Memory, a PROM Programmable Read Only Memory, an EPROM Erasable Programmable Read Only Memory, an EEPROM Electrically Erasable Programmable Read Only Memory and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A vehicle mounted communication system comprising:
   a mobile radio comprising:
      a radio processor;
      a transceiver operatively coupled to the radio processor;
      a short range communication module operatively coupled to the transceiver;
   a main speaker;
   a microphone coupled to the mobile radio, wherein the microphone comprises a (Push-To-Talk) PTT button, the microphone operating in one of an on-hook mode of operation and an off-hook mode of operation;
   a hook sense circuit for detecting whether the microphone is located in its on-hook location or whether it has been physically removed from its on-hook location and is thus off-hook; and
   a short range wireless headset, comprising a second microphone and a second speaker, operatively coupleable to the short range communication module;
   wherein the radio processor is configured to:
      make a first determination of whether the short range wireless headset is coupled to the short range communication module;
      make a second determination, via the hook sense circuit, of whether the microphone is on-hook or off-hook; and
      route incoming audio received via the transceiver to one of the main speaker and the second speaker as a function of both the first determination and the second determination.

2. The vehicle mounted communication system of claim 1 further comprising:
   an indicator for indicating a status of a coupling state between the short range communication module and the short range wireless headset.

3. The vehicle mounted communication system of claim 1, wherein the radio processor is configured to switch the microphone to active and the second microphone to inactive in response to activation of the PTT button when the first determination is that the short range wireless headset is coupled to the short range communication module and the second determination is that the microphone is off-hook.

4. The vehicle mounted communication system of claim 3, wherein the radio processor is configured to route the incoming audio received via the transceiver to the main speaker when the first determination is that the short range wireless headset is coupled to the short range communication module and the second determination is that the microphone is off-hook.

5. The vehicle mounted communication system of claim 3, further comprising an auxiliary public address speaker and a public address switch for activating a Public Address mode;
   wherein the radio processor is configured to make a third determination of whether the public address switch is activated, and
   wherein the radio processor is configured to route incoming audio received via the microphone to the auxiliary public address speaker when the second determination is that the microphone is off-hook and the third determination is that the public address switch is activated.

6. The vehicle mounted communication system of claim 1, wherein the radio processor is configured to route the incoming audio received via the transceiver to the second speaker in the short range wireless headset when the first determination is that the short range wireless headset is coupled to the short range communication module and the second determination is that the microphone is on-hook.

7. The vehicle mounted communication system of claim 1, wherein the short range wireless headset is a Bluetooth headset, and the first determination of whether the the short range wireless headset is coupled to the short range communication module comprises determining whether the short range wireless headset is successfully paired to the short range communication module.

8. The vehicle mounted communication system of claim 1, further comprising an auxiliary public address speaker and a public address switch for activating a Public Address mode;
   wherein the radio processor is configured to make a third determination of whether the public address switch is activated, and wherein the radio processor is configured to route incoming audio received via the second microphone to the auxiliary public address speaker when the second determination is that the microphone is on-hook and the third determination is that the public address switch is activated.

9. A method of routing audio for a vehicle mounted communication system, the method comprising:
   activating a (Push-To-Talk) PTT button associated with a handheld microphone;
   making a first determination of whether a short range wireless device is operationally coupled with a wireless communication module, comprised in the vehicle mounted communication device;
   making a second determination, via a hook sense circuit configured to detect whether the handheld microphone is located in its on-hook location or whether it has been physically removed from its on-hook location and is thus off-hook, of whether the handheld microphone is operating in an on-hook mode or an off-hook mode;
   switch to receiving first audio signals from a second microphone comprised in a short range wireless device communicatively coupled to the vehicle mounted communication system when the first determination is that the short range wireless device is operationally coupled with the wireless communication module and the second determination is that the handheld microphone is operating in the on hook mode; and
   switch to receiving first audio signals from the handheld microphone when the first determination is that the short range wireless device is operationally coupled with the wireless communication module and the second determination is that the handheld microphone is operating in the off hook mode.

10. The method of claim 9, further comprising:
routing the first audio signals, from the handheld microphone, to an auxiliary speaker associated with the vehicle mounted communication device when the first determination is that the short range wireless device is operationally coupled with the wireless communication module and the second determination is that the handheld microphone is operating in the off hook mode and responsive to activation of a public address switch.

11. The method of claim 9, further comprising:
indicating a status of a coupling state between the short range wireless device and the wireless communication module.

12. The method of claim 9, further comprising:
routing second audio signals received via a transceiver to a speaker in the short range wireless device when the first determination is that the short range wireless device is operationally coupled with the wireless communication module and the second determination is that the handheld microphone is operating in the on hook mode.

* * * * *